May 8, 1962  R. D. PATTERSON  3,033,244
WIRE TIGHTENING AND TWISTING TOOL
Filed April 3, 1959

INVENTOR.
Richard D. Patterson
BY John A. Hamilton
Attorney.

United States Patent Office 3,033,244
Patented May 8, 1962

3,033,244
WIRE TIGHTENING AND TWISTING TOOL
Richard D. Patterson, Rte. 1, Box 61A, Holden, Mo.
Filed Apr. 3, 1959, Ser. No. 804,012
4 Claims. (Cl. 140—118)

This invention relates to new and useful improvements in wire handling tools, and has particular reference to a wire tightening and twisting tool.

The principal object of the present invention is the provision of a tool operable to grip the contiguous ends of two wires to be joined, to place said wires under tension, and to twist the ends of said wires together tightly and securely to join them.

Another object is the provision of a tool of the character described wherein the stretching of the wires is accomplished by means of a pair of relatively pivoted levers, and including novel means for adjusting the mechanical advantage delivered by said levers for tensioning the wires, and also the amount of tensioning movement furnished thereby.

Other objects are simplicity and economy of construction, efficiency and dependability of operation, and adaptability to use ordinary pry bars as the principal operating parts thereof.

With these objects in view, as well as other objects which will appear in the course of the specification, reference will be had to the drawing, wherein.

Figures 1, 2, 3, 4:
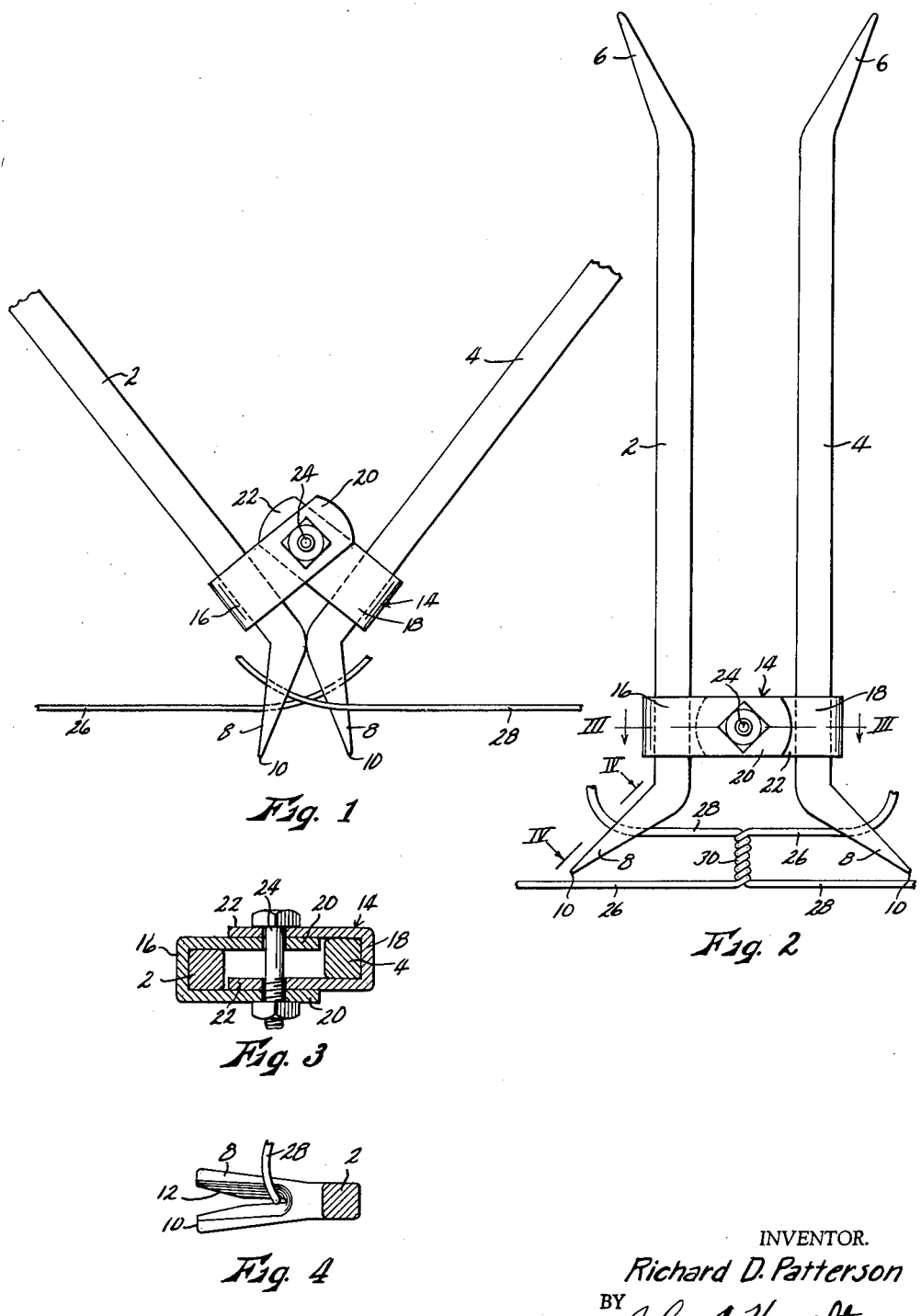
FIG. 1 is a side elevational view of a wire tightening and twisting tool embodying the present invention, with portions broken away, showing the parts in the position assumed at the moment of attachment thereof to the wires to be tightened and twisted together.
FIG. 2 is a view similar to FIG. 1, showing the entire tool, and with the parts in the position assumed when the wires have been stretched or tightened and twisted together.
FIG. 3 is a sectional view taken on line III—III of FIG. 2.
FIG. 4 is a face view of one of the wire gripping claws of the tool, taken in the direction of the arrows IV—IV in FIG. 2.

Like reference numerals apply to similar parts throughout the several views, and the numerals 2 and 4 apply respectively to a pair of handles or levers which may constitute ordinary carpenters' pry bars. Such a pry bar ordinarily constitutes a straight body portion which may be of round, square, hexagonal or other cross-sectional contour, having at one end thereof an angled prying blade 6 (not directly involved in the present invention), and having at its opposite end an angled claw 8, said claw being tapered to a thin edge at 10 and having a tapered notch 12 formed in the end thereof, as best shown in FIG. 4. The pry bars, particularly with respect to the claws 8 and notches 12 thereof, are commonly used for pulling nails in a manner well understood in the art, but in the present device are utilized as wire gripping elements, as will presently appear.

The handles 2 and 4 are disposed so that the claws 8 thereof are divergent when their body portions are substantially parallel as in FIG. 2, and are joined together adjacent their claw ends by means of a pivot bracket designated generally by the numeral 14. Said bracket includes two identical U-shaped clips 16 and 18, each of which fits snugly but slidably over one of the handles, said handle resting against the connecting portion of its U-shaped clip. The arms 20 of clip 16 extend transversely to handle 2, toward handle 4, and the arms 22 of clip 18 extend transversely to handle 4, toward handle 2. The arms 20 and 22 are disposed in staggered or interdigitated relation as best shown in FIG. 3, and are joined by a single bolt 24 extending therethrough. As said bolt is tightened, it will draw the arms of the clips toward each other to grip the handles 2 and 4 tightly therebetween, thereby securing said handles against longitudinal or other movement in the clips. At the same time, due to the length of the clip arms, the bolt will not be sufficiently tight to prevent the clips from moving pivotally with respect to each other.

In use, the handles 2 and 4 are first moved away from each other, as shown in FIG. 1, so that the claws 8 are moved toward each other, and the ends of the two wires 26 and 28 to be joined are pressed respectively into the notches 12 of said claws, as in FIG. 4. The claw edges bounding the notches are sufficiently sharp to bite into the wires and positively prevent any slippage of said wires. It will be seen that each wire is connected in the claw most distant therefrom in the direction from which said wire extends, so that the wire ends are disposed in overlapping, oppositely extending relation. The handles 2 and 4 are then drawn toward each other by pivoting clips 16 and 18 about bolt 24. This of course pulls claws 8 farther apart, and tensions wires 26 and 28. When the desired tension is obtained, the two wires are twisted together, as indicated at 30, by turning the entire tool about an axis parallel to and between handles 2 and 4.

Thus it will be seen that a tool having several advantages has been produced. The handles 2 and 4 and their associated claws 8 may constitute ordinary pry bars such as commonly used by carpenters. The use of the pivot bracket 14 does not require drilling, special forming, or any other change or modification of the pry bars. The clips 16 and 18 can be supplied to fit handles of any size, and will clamp on handles of many different cross-sectional shapes, although square and hexagonal are perhaps the commonest shapes. The clamping action of the clips is provided by a single bolt, and the interdigitated relation of the clip arms 20 and 22 provides that both of the handles will be gripped with substantially equal force. This relation also provides, as shown in FIG. 3, that the two handles 2 and 4 do not lie in precisely the same plane at right angles to the axis of bolt 24, but are slightly offset. This offset is useful in permitting the wire ends to be intersected or overlapped as in FIG. 1 without undue interference between the wires and the claws. When the bolt 24 is loosened, handles 2 and 4 may be moved slidably through the clips, to change the distance between said clips and the claws 8. This alters the mechanical advantage of the leverage provided by handles 2 and 4 to tension the wires, and also the extent of the relative movement between the claws 8. In this manner the tool may be better adapted for specific jobs. It will be further seen that one arm 20 or 22 of each clip 16 and 18 extends between the arms of the other clip to a point immediately adjacent the handle 2 or 4 carried by said other clip. Thus the handles are positively prevented from slipping inwardly toward bolt 24. However, the ends of said clip arms are formed arcuately concentrically with bolt 24, in order that they will not interfere with the pivotal action between the two clips.

While I have shown and described a specific embodimen of my invention, it will be readily apparent that many minor changes of structure and operation could be made without departing from the spirit of the invention as defined by the scope of the appended claims.

What I claim as new and desire to protect by Letters Patent is:

1. A wire tightening and twisting tool comprising a pair of elongated handles each having a wire gripping means at one end thereof, a pair of clips attached respectively to said handles and being adjustable longitudinally along said handles, and a pivot member interconnecting said clips whereby to permit relative pivotal movement of said handles about an axis intermediate their ends and disposed transversely to a plane including said handles.

2. A wire tightening tool as recited in claim 1 wherein each of said clips is U-shaped, having a pair of arms embracing one of said handles and being normally slidable therealong, the arms of one of said clips extending into overlapping relation with the arms of the other of said clips, said pivot member comprising a bolt extending through the overlapping portions of all of said clip arms, whereby when said bolt is tightened, it will draw said arms toward each other to clamp said handles firmly therebetween.

3. The structure as recited in claim 2 wherein one of the arms of each of said clips extends between the arms of the other of said clips, to a point closely adjacent the handle carried by said other clip.

4. The structure as recited in claim 2 wherein one of the arms of each of said clips extends between the arms of the other of said clips, to a point closely adjacent the handle carried by said other clip, and wherein the end of said extending arm just described is curved concentrically to said pivot bolt.

References Cited in the file of this patent

UNITED STATES PATENTS

| | | |
|---|---|---|
| 478,600 | Haworth | July 12, 1892 |
| 692,818 | Berry | Feb. 11, 1902 |
| 1,494,755 | Nelson | May 20, 1924 |
| 2,632,348 | Norris et al. | Mar. 24, 1953 |
| 2,901,817 | Steyer | Sept. 1, 1959 |

FOREIGN PATENTS

| | | |
|---|---|---|
| 24,069 | Germany | Sept. 11, 1883 |
| 1,056,175 | France | Feb. 24, 1954 |